US011287022B2

(12) United States Patent
Chaudhari et al.

(10) Patent No.: US 11,287,022 B2
(45) Date of Patent: Mar. 29, 2022

(54) DIFFERENTIAL LOCKING SYSTEM

(71) Applicant: Dana Heavy Vehicle Systems Group, LLC, Maumee, OH (US)

(72) Inventors: Prashant L. Chaudhari, Pune (IN); Akash A. Aware, Pune (IN); Virendra V. Kumbhar, Pune (IN); Pravin V. Karande, Pune (IN)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 17/155,039

(22) Filed: Jan. 21, 2021

(65) Prior Publication Data

US 2021/0222762 A1 Jul. 22, 2021

(30) Foreign Application Priority Data

Jan. 22, 2020 (IN) .............................. 202011002796

(51) Int. Cl.
*F16H 48/24* (2006.01)
*F16H 48/30* (2012.01)

(52) U.S. Cl.
CPC ............. *F16H 48/24* (2013.01); *F16H 48/30* (2013.01)

(58) Field of Classification Search
CPC .......... F16H 48/24; F16H 48/30; F16H 48/08; F16H 48/38; F16H 48/40; F16H 2063/321
See application file for complete search history.

(56) References Cited

U.S. PATENT DOCUMENTS

| | | | | |
|---|---|---|---|---|
| 2,309,441 | A * | 1/1943 | Cook | F16H 48/30 475/223 |
| 2,876,658 | A * | 3/1959 | McColl | F16H 48/08 475/86 |
| 3,107,763 | A * | 10/1963 | Hill | F16H 3/54 192/41 R |
| 3,766,342 | A | 10/1973 | Stadelmann | |
| 3,916,728 | A | 11/1975 | Behar | |
| 4,138,906 | A * | 2/1979 | Nakao | B60K 17/3467 475/218 |
| 4,703,671 | A * | 11/1987 | Jikihara | F16H 48/08 475/158 |
| 4,895,469 | A * | 1/1990 | Coueron | F16B 21/186 403/21 |
| 5,342,255 | A | 8/1994 | Slesinski | |
| 5,941,126 | A * | 8/1999 | Hirsch | F16H 63/32 74/473.37 |
| 6,443,869 | B1 | 9/2002 | Schreier | |
| 7,040,190 | B2 * | 5/2006 | Dinger | F16H 63/32 74/473.36 |
| 7,140,475 | B1 | 11/2006 | Appelqvist | |
| 7,866,433 | B2 | 1/2011 | Martin, III | |
| 2010/0181137 | A1 | 7/2010 | Ishida | |

FOREIGN PATENT DOCUMENTS

| | | | | |
|---|---|---|---|---|
| EP | | 1079154 A2 * | 2/2001 | ............. F16H 63/32 |
| JP | | 57196325 A * | 12/1982 | ............. F16H 63/32 |

* cited by examiner

*Primary Examiner* — Sherry L Estremsky
(74) *Attorney, Agent, or Firm* — Marshall & Melhorn, LLC (57) ABSTRACT

A differential locking system that can rotationally lock a shift fork and a sliding clutch assembly to ensure correct engagement of an axle shaft with a sliding clutch assembly during reassembly of an axle shaft. The differential locking system includes a first portion of a push rod is selectively engaged with a portion of the shift fork and a second portion of the push rod is selectively engaged with a portion of a carrier housing.

18 Claims, 11 Drawing Sheets

FIG. 16

DIFFERENTIAL LOCKING SYSTEM

CROSS-REFERENCE TO RELATED APPLICATIONS

The present application claims the benefit to Indian Non-Provisional Patent Application No. 202011002796, filed Jan. 22, 2020, which are incorporated herein by reference in their entirety.

FIELD

The present disclosure relates to a differential locking system for use in a motor vehicle.

BACKGROUND

A locking differential is a variation of a standard automotive differential (or open differential) that enables a vehicle to experience an increase in traction in comparison to the standard differential. Vehicle drive axles typically include a pair of axle shafts for driving the vehicle's wheels. Under normal driving conditions, the wheels and corresponding axle shafts will be turning at approximately the same speed and the same amount of torque will apply to each wheel. In poor road conditions, the locking differential essentially connects the axle shafts together such that the axle shafts rotate at the same speed. Once normal road conditions are reached again, it is desirable to unlock the differential and to enable the wheels in the axle system to rotate at different speeds again.

Problems occur, though, when removing and reassembling an axle shaft on an axle assembly. For example, various components of a locking differential, such as a sliding clutch and a shift fork, rotate downward and contact a carrier housing or a portion of the axle housing when an axle shaft is removed. This misalignment results in unwanted engagement of the axle shaft with the sliding clutch assembly and problems reassembling the axle shaft into the axle assembly.

Consequently, there is a need for an improved differential locking system that can rotationally lock a shift fork and a sliding clutch assembly to facilitate correct engagement of an axle shaft with a sliding clutch assembly during reassembly of an axle shaft.

SUMMARY

An improved differential locking system that can rotationally lock a shift fork and a sliding clutch assembly to facilitate correct engagement of an axle shaft with a sliding clutch assembly during reassembly of an axle shaft.

In an embodiment, the differential locking system includes an axle half shaft; a locking differential; and a sliding clutch assembly slidingly engaged with the axle half shaft. The sliding clutch is coupled to a portion of the axle half shaft, wherein the sliding clutch includes a plurality of sliding clutch teeth; a fixed clutch having a plurality of fixed clutch teeth, wherein the fixed clutch teeth are selectively engaged to the sliding clutch teeth. The differential locking system further includes a shift fork having a first end and a second end, wherein the first end is drivingly engaged with the sliding clutch, wherein the second end has an interior surface defining a circular aperture therein, and wherein the interior surface has a flat and straight wall. The differential locking system also includes a push rod including a first circular section having a first flat portion and a second circular section, wherein the diameter of the second circular section may be less than the diameter of the first circular section; and wherein the first flat portion of the push rod selectively engages the wall in the interior surface of the shift fork; and a carrier housing at least partially surrounding the shift fork and the push rod, wherein the carrier housing includes an opening configured to lock a portion of the second circular section of the push rod.

In some embodiments, the opening in the carrier housing includes a substantially straight and flat wall. Also, the second circular section on the push rod has a second flat portion, wherein the second flat portion engages the opening in the carrier housing such that rotation of the shift fork and the sliding clutch assembly is restricted.

In some embodiments, the opening in the carrier housing includes an oval end portion and the second circular section on the push rod includes a slot having key portion press fit into the slot. At least a portion of the key portion selectively engages with the oval end portion on the carrier housing opening such that rotation of the shift fork and the sliding clutch assembly is restricted.

BRIEF DESCRIPTION OF THE DRAWINGS

The above, as well as other advantages of the present disclosure, will become readily apparent to those skilled in the art from the following detailed description when considered in light of the accompanying drawings in which.

DETAILED DESCRIPTION

It is to be understood that the disclosure may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

Disclosed herein is a differential locking system. It is within the scope of this disclosure that the differential locking system may be used in an axle assembly of a tandem axle assembly, a tridem axle assembly, a single axle assembly, and/or an electric axle assembly.

Additionally, it is within the scope of this disclosure, and as a non-limiting example, that the differential locking system disclosed herein may be used in automotive, off-road vehicle, all-terrain vehicle, construction, and structural applications. As a non-limiting example, the differential locking system disclosed herein may also be used in passenger vehicle, electric vehicle, hybrid vehicle, commercial vehicle, autonomous vehicles, semi-autonomous vehicles and/or heavy vehicle applications.

For description purposes, the terms "prime mover", "engine," "electric machine," and like terms, are used herein to indicate a power source. Said power source could be fueled by energy sources including hydrocarbon, electrical, solar, and/or pneumatic, to name but a few. Although typically described in a vehicle or automotive application, one skilled in the art will recognize the broader applications for this technology and the use of alternative power sources for driving a transmission including this technology.

Figure 1:
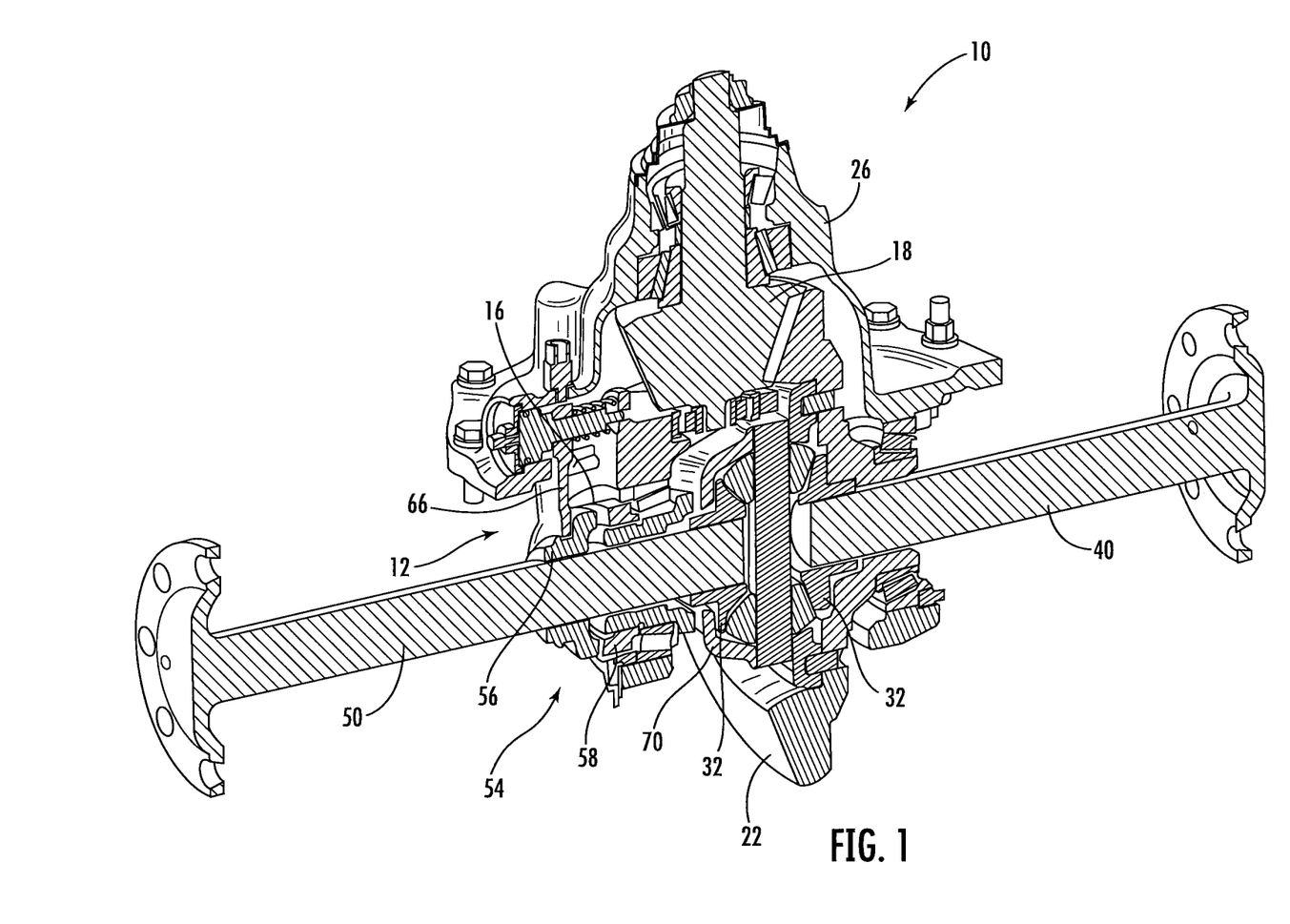
FIG. 1 is a schematic cross-sectional view of a portion of an axle assembly having a differential locking system according to an embodiment of the disclosure.

FIG. 1 is a schematic cross-sectional view of a portion of an axle assembly 10 having a differential locking system 12 according to an embodiment of the disclosure. The differential locking system 12 in this embodiment comprises a wheel differential lock that may positively lock a wheel differential to provide improved traction under adverse road conditions. The axle assembly 10 includes an axle housing (not shown) having a size and a shape to receive and/or retain various components of the axle assembly 10 therein.

Rotational energy is provided to the axle assembly 10 through an input shaft (not shown) that is rotated by an engine or a prime mover (not shown). Integrally connected to at least a portion of the input shaft is a pinion gear 18. The pinion gear 18 is drivingly connected to a differential ring gear 22.

Extending co-axially with and integrally connected to at least a portion of the differential ring gear 22 is a differential case 70. A portion of the differential case 70 may be integrally connected to a portion of the differential ring gear 22.

In accordance with the embodiment illustrated in FIG. 1 and as a non-limiting example, at least a portion of a first axle half shaft 40 and at least a portion of an opposing second axle half shaft 50 may be disposed within the differential case 70. At least a portion of each of the first axle half shaft 40 and the second axle half shaft 50 is slidingly engaged with a differential side gear 32.

As best seen in FIG. 1, extending co-axially with and slidingly engaged with the second axle half shaft 50 is a sliding clutch assembly 54. The sliding clutch assembly 54 includes a sliding clutch 56 splined to a portion of the second axle half shaft 50 and a fixed clutch 58 splined to a portion of the differential case 70. Disposed around the perimeter of the fixed clutch 58 is a bearing adjuster 16.

Figure 2:
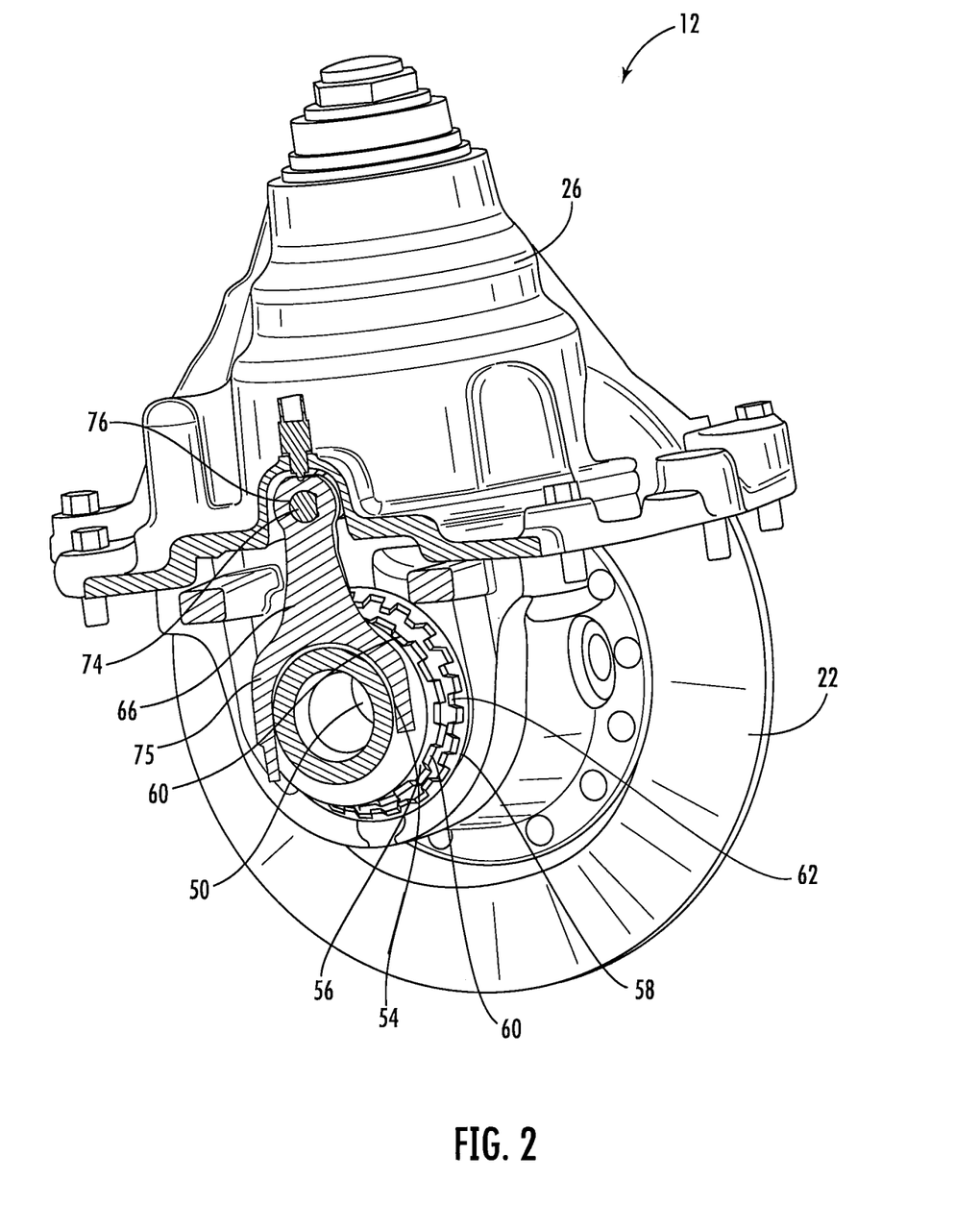
FIG. 2 is a schematic partial sectional view of the differential locking system illustrated in FIG. 1, showing a push rod engaging a shift fork.
Figure 3:
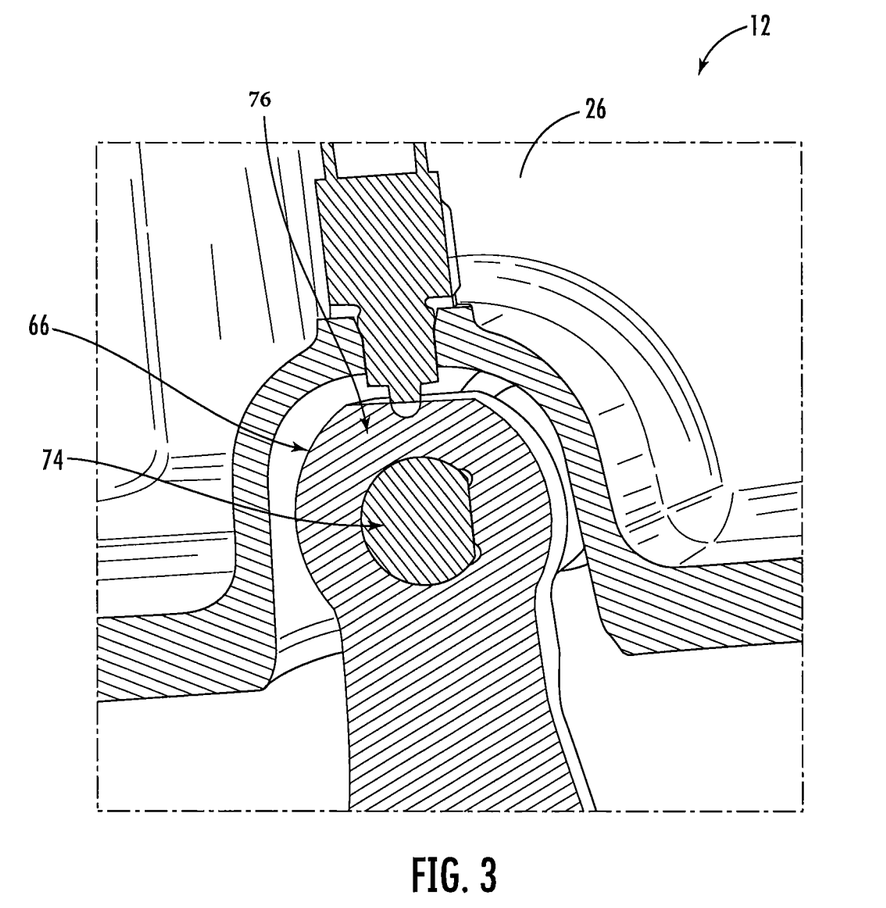
FIG. 3 is a schematic enlarged view of the differential locking system illustrated in FIG. 2.

FIGS. 2 and 3 are schematic sectional views of a portion of the differential locking system 12 illustrated in FIG. 1 showing a push rod 74 engaged with a shift fork 66. Circumferentially extending from the sliding clutch 56 is a plurality of sliding clutch teeth 60. The plurality of sliding clutch teeth 60 are complementary to and selectively engageable with a plurality of fixed clutch teeth 62. Engagement of the sliding clutch teeth 60 with the fixed clutch teeth 62 locks the differential locking system 12, which prevents wheel differential action. When the sliding clutch teeth 60 moves out of engagement with the fixed clutch teeth 62, the differential locking system 10 is unlocked and operates as intended.

In order to transition the differential locking system 12 from a first position (sliding clutch teeth 60 engaged with the fixed clutch teeth 62) to a second position (sliding clutch teeth 60 disengaged from the fixed clutch teeth 62), an actuator is used. As a non-limiting example, the actuator is a piston, a pneumatic piston, a push rod, a pneumatic actuator, or any combinations thereof. In some embodiments, the actuator is a linear push rod 74.

As seen in FIG. 2, a first end 75 of the shift fork 66 is in selective driving engagement with at least a portion of the sliding clutch assembly 54, such as the sliding clutch 56. The shift fork 66 selectively moves the sliding clutch 56 axially into and out of engagement with the fixed clutch 58. The shift fork 66 may be moved in an axial direction by the push rod 74.

Figure 8:
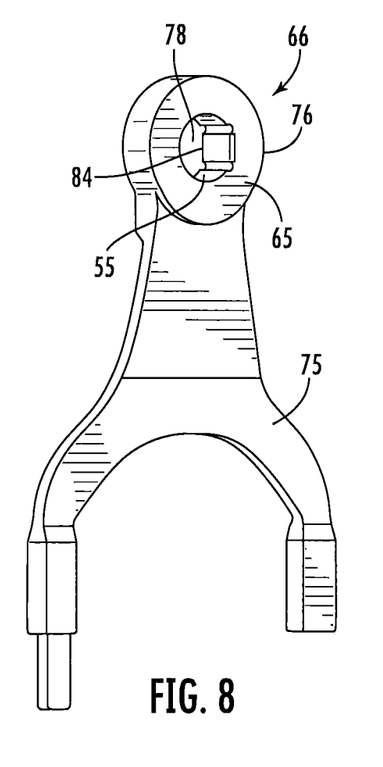
FIG. 8 is a schematic perspective view of a shift fork according to an embodiment of the disclosure.
Figure 9:
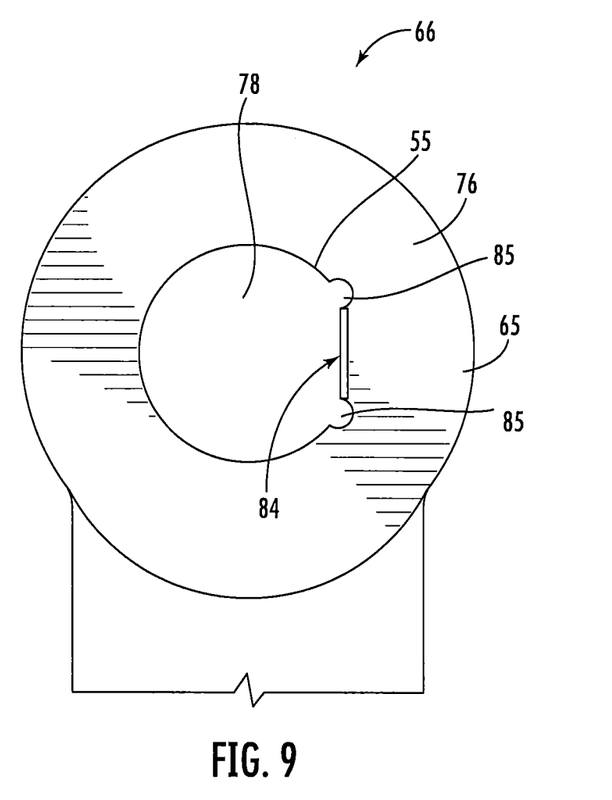
FIG. 9 is a schematic enlarged view of the shift fork illustrated in FIG. 8.

The first end 75 of the shift fork 66 is in selective driving engagement with the sliding clutch 56 and a second end 76 of the shift fork 66 is housed within a portion of the carrier housing 26. The second end 76 of the shift fork 66 includes an interior surface 55 and an exterior surface 65, wherein the interior surface 55 defines a circular aperture 78 extending from one side of the second end 76 to another sider. The interior surface 55 includes a substantially flat and straight wall 84 interposed between two opposing grooves 85, as best shown in FIGS. 3, 8, and 9. One of ordinary skill in the art would understand that the shape and configuration of the interior surface 55 and the circular aperture 78 may vary in other embodiments.

Figure 10:
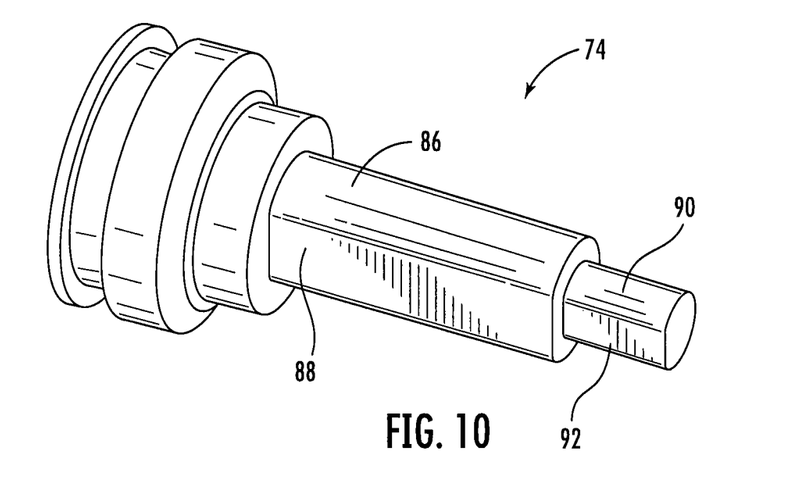
FIG. 10 is a schematic perspective view of a push rod according to an embodiment of the disclosure.
Figure 11:
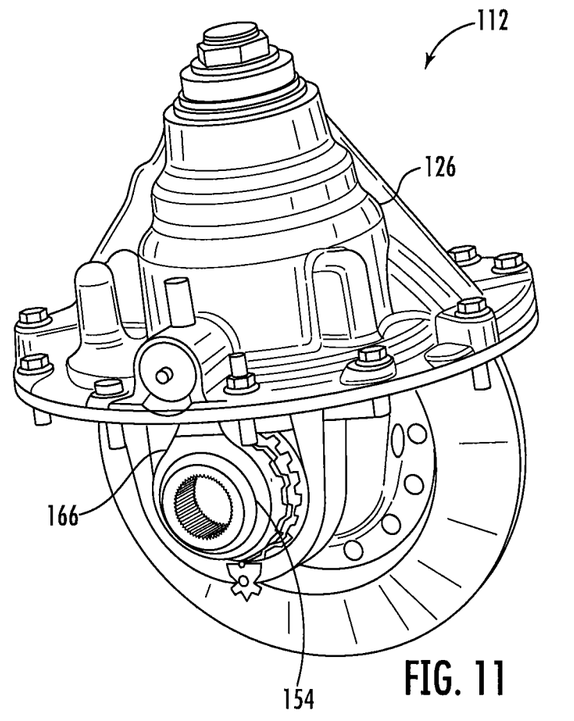
FIG. 11 is a schematic perspective view of a differential locking system according to an alternative embodiment of the disclosure.

As best shown in FIG. 10, the push rod 74 includes a first circular section 86 having a first substantially flat outer portion 88. The push rod 74 also includes a second circular section 90 extending axially from the first circular section 86, wherein the second circular section 90 may have a reduced diameter compared to the first circular section 86 and includes a second substantially flat outer portion 92.

As shown in FIGS. 2 and 3, the first flat portion 88 of the first circular section 86 selectively engages with the wall 84 on the interior surface 55 of the second end 76 of the shift fork 66. As a result, the rotation of the shift fork 66 is restricted, which helps prevent the downward rotation of the shift fork 66 when the second axle half shaft 50 is removed from the axle assembly 10. The shift fork 66 is perpendicular to the push rod 74.

Figure 4:
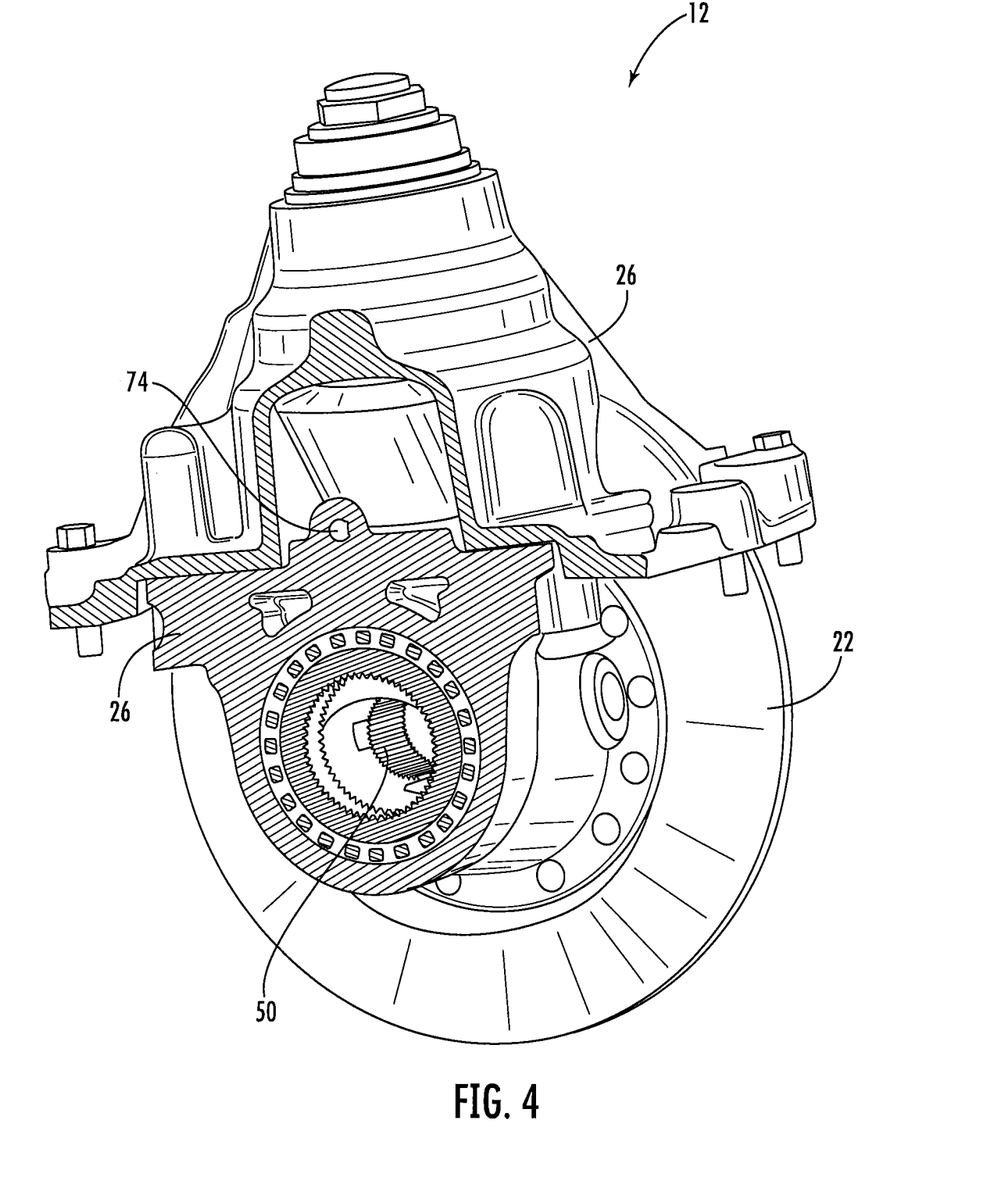
FIG. 4 is another schematic sectional view of the differential locking system illustrated in FIG. 1, showing the push rod illustrated in FIG. 2 engaging a carrier housing.
Figure 5:
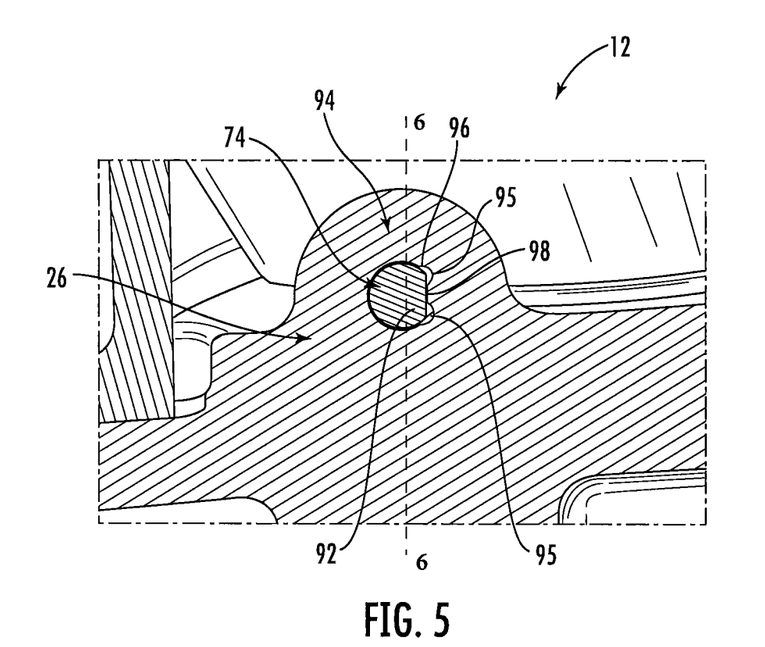
FIG. 5 is a schematic enlarged view of a push rod engaged with the carrier housing on the differential locking system illustrated in FIG. 4.
Figure 6:
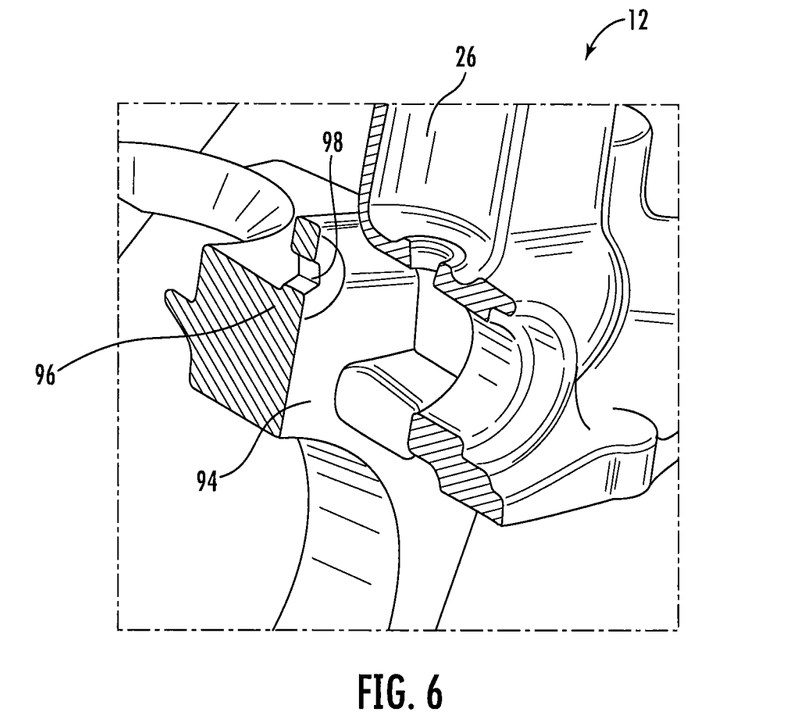
FIG. 6 is a schematic sectional view along lines 6-6 of FIG. 5 showing a portion of the carrier housing.
Figure 7:
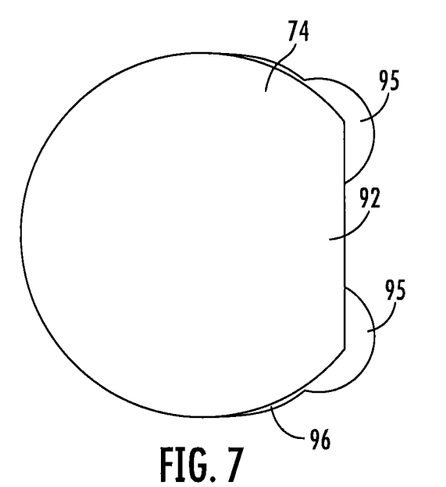
FIG. 7 is a schematic plan view of the push rod engaging with the carrier housing illustrated in FIGS. 1, 2, 4, and 6.

FIGS. 4-6 are schematic sectional views of a portion of the differential locking system 12 illustrated in FIG. 1. The figures show the push rod 74 engaged with an interior portion 94 of the carrier housing 26. The interior portion 94 of the carrier housing 26 includes an opening 96. The opening 96 may comprise a variety of different shapes and configurations. In the embodiment shown in FIGS. 5 and 6, the opening 96 is substantially "D-shaped." In other words, the opening 96 forms a substantially straight and flat wall 98 at one end that is interposed between two opposing, semi-circular corners 95.

The second flat portion 92 of the second circular section 90 of the push rod 74 selectively engages the opening 96 in the interior portion 94 of the carrier housing 26. In an embodiment, the second flat portion 92 of the push rod 74 is locked within the opening 96 of the carrier housing 26 such that no portions of the push rod 74 protrude out of the opening 96. As a result, the rotation of the shift fork 66 and the sliding clutch assembly 54 is restricted, which helps prevent their downward rotation when the second axle half shaft 50 is removed from the axle assembly 10. Thus, it will ensure correct engagement of the second axle half shaft 50 with the sliding clutch assembly 54 during reassembly of the second axle half shaft 50.

FIGS. 11-16 are schematic views of a differential locking system 112 according to an alternative embodiment of the disclosure. The differential locking system 112 illustrated in FIGS. 11-16 is the same as the differential locking system 12 illustrated in FIGS. 1-10, except where specifically noted below.

Figure 12:
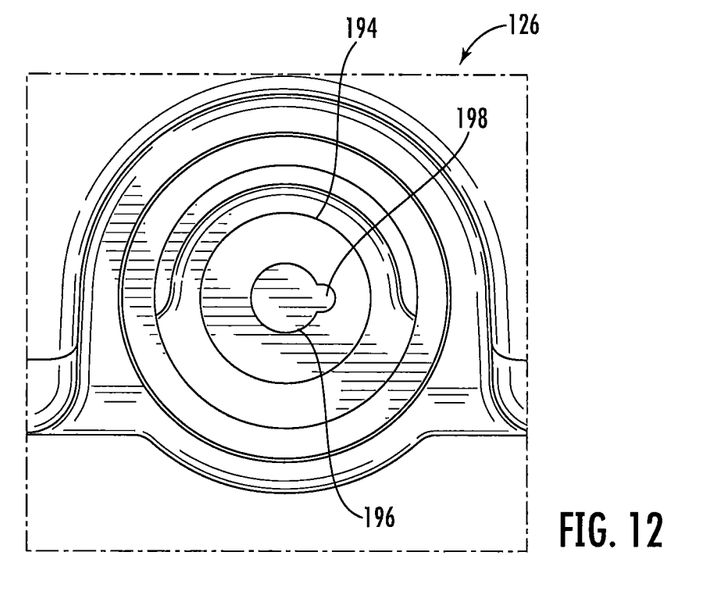
FIG. 12 is a schematic sectional view of a portion of a carrier housing on the differential locking system illustrated in FIG. 11.
Figure 13:
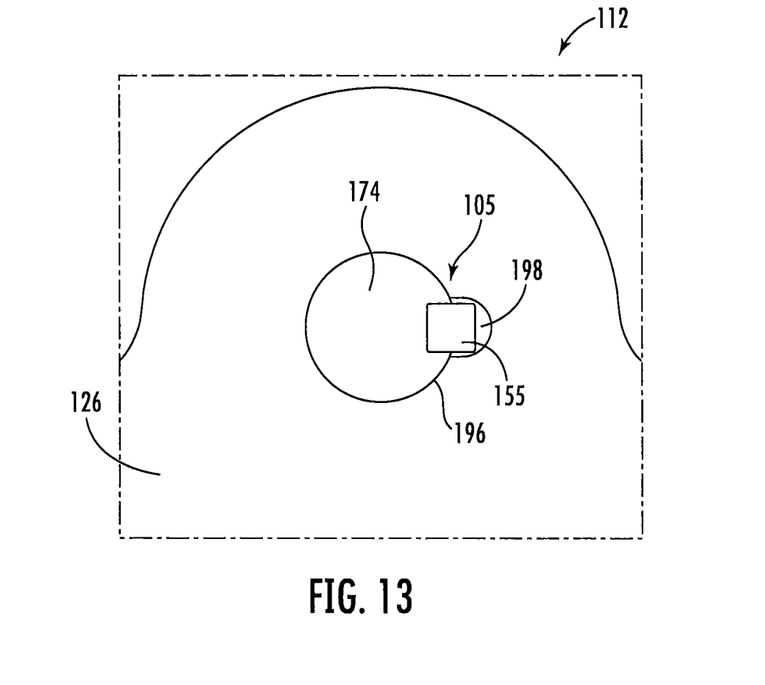
FIG. 13 is a schematic plan view of a push rod and key assembly engaged with the carrier housing illustrated in FIG. 12.

FIGS. 12 and 13 are schematic sectional views of an interior portion 194 of a carrier housing 126 on the differential locking system 112. The interior portion 194 of the carrier housing 126 includes an opening 196. The opening 196 may comprise a variety of different shapes and configurations. In an embodiment, the opening 196 is substantially circular with an oval end portion 198.

As shown in FIG. 13, the opening 196 receives a push rod and key assembly 105. The shape of the opening 196 acts to rotationally lock the push rod and key assembly 105. As a result, the rotation of a shift fork 166 and a sliding clutch assembly 154 are restricted, which helps prevent the downward rotation of the shift fork 166 and a sliding clutch assembly 154 when an axle shaft (not shown) is removed from an axle assembly.

Figure 14:
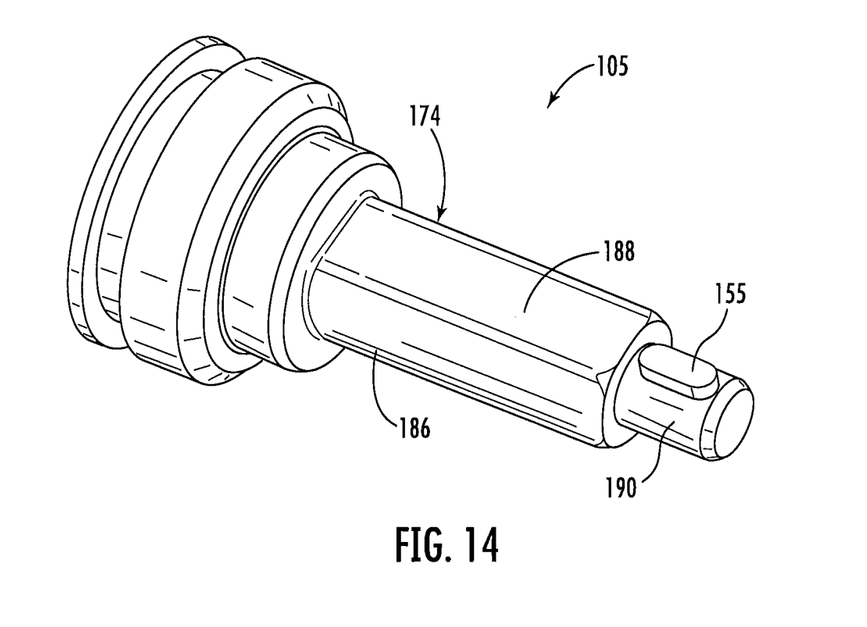
FIG. 14 is a schematic perspective view of the push rod and key assembly illustrated in FIG. 13.
Figure 15:
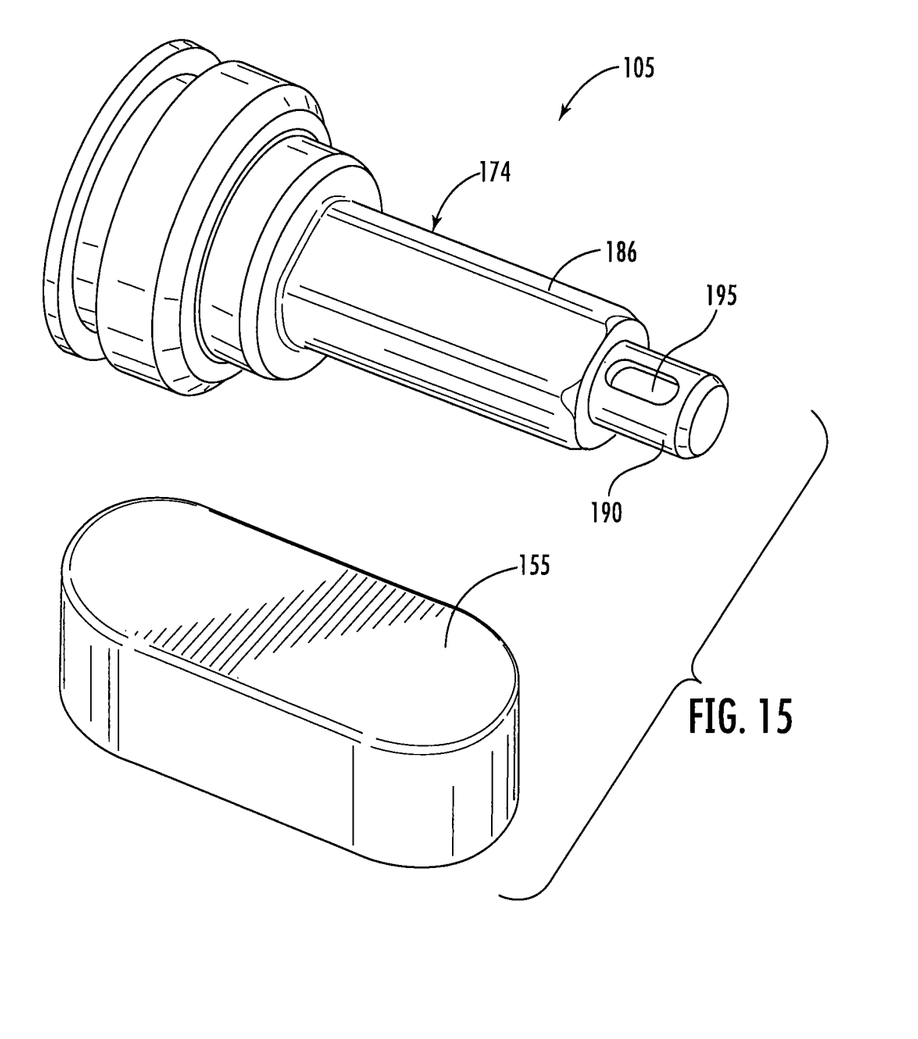
FIG. 15 is a schematic exploded view of the push rod and key assembly illustrated in FIG. 14.
Figure 16:
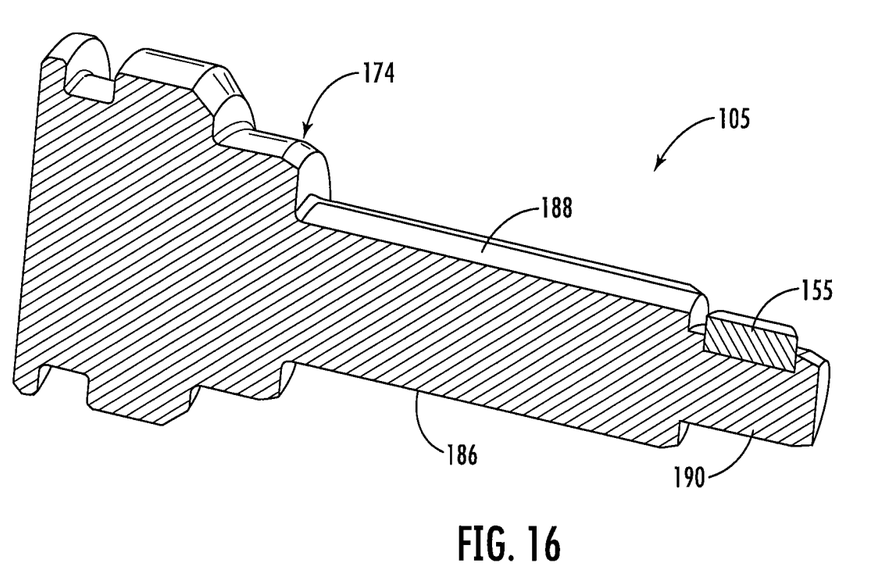
FIG. 16 is a schematic sectional view of the push rod and key assembly illustrated in FIGS. 14 and 15.

As shown in FIGS. 14-16, the push rod and key assembly 105 includes a push rod 174 having a first circular section 186 and a second circular section 190 extending axially from the first circular section 186, wherein the diameter of the first circular section 186 may be greater than the diameter of the second circular section 190. The first circular section 186 has a first substantially flat outer portion 188. In certain embodiments, the second circular section 190 includes a slot 195 for receiving a key portion 155. The key portion 155 may have a variety of different shapes and configurations, such as having an oval shape and a cylindrical shape, as long as it may be press fit into the second circular section 190 of the push rod 174. In other embodiments, the key portion 155 may be integrally formed with the push rod 174 as a unitary component.

The flat outer portion 188 of the first circular section 186 of the push rod 174 selectively engages with a portion of the shift fork 166 and the second circular section 190 selectively engages with the opening 196 in the carrier housing 126 such that at least a portion of the key portion 155 engages with the oval end portion 198. As a result, the differential locking system 112 helps to ensure correct engagement of an axle shaft with the sliding clutch assembly 154 during reassembly of the axle shaft.

It is to be understood that the various embodiments described in this specification and as illustrated in the attached drawings are simply exemplary embodiments illustrating the inventive concepts as defined in the claims. As a result, it is to be understood that the various embodiments described and illustrated may be combined from the inventive concepts defined in the appended claims.

In accordance with the provisions of the patent statutes, the present disclosure has been described to represent what is considered to represent the preferred embodiments. However, it should be noted that this disclosure can be practiced in other ways than those specifically illustrated and described without departing from the spirit or scope of this disclosure.

What is claimed is:

1. A differential locking system comprising:
   an axle half shaft;
   a locking differential;
   a sliding clutch assembly slidingly engaged with the axle half shaft, wherein the sliding clutch assembly comprises:
      a sliding clutch coupled to a portion of the axle half shaft, wherein the sliding clutch includes a plurality of sliding clutch teeth;
      a fixed clutch having a plurality of fixed clutch teeth, wherein the fixed clutch teeth are selectively engaged to the sliding clutch teeth;
   a shift fork having a first end and a second end, wherein the first end is drivingly engaged with the sliding clutch, wherein the second end has an interior surface defining a circular aperture therein, and wherein the interior surface has a substantially flat and straight portion;
   a push rod including a first circular section having a first flat portion and a second circular section having a second flat portion, wherein the first flat portion of the push rod engages the substantially flat and straight portion in the interior surface of the shift fork; and
   a carrier housing at least partially surrounding the shift fork and the push rod, wherein the carrier housing includes an opening configured to lock a portion of the second circular section of the push rod, wherein the opening in the carrier housing includes a substantially straight and flat wall portion, and wherein the second flat portion of the second circular section engages the opening in the carrier housing such that rotation of the shift fork and the sliding clutch assembly is restricted.

2. The differential locking system of claim 1, wherein the wall portion in the carrier housing opening is interposed between two opposing semi-circular corners.

3. The differential locking system of claim 1, wherein the opening in the carrier housing includes an oval end portion.

4. The differential locking system of claim 3, wherein the second circular section includes a slot, and wherein a key portion is press fit into the slot.

5. The differential locking system of claim 4, wherein at least a portion of the key portion selectively engages with the oval end portion on the carrier housing opening such that rotation of the shift fork and the sliding clutch assembly is restricted.

6. The differential locking system of claim 1, wherein the fixed clutch is splined to a portion of a differential case.

7. The differential locking system of claim 1, wherein the substantially flat and straight portion in the interior surface of the shift fork is interposed between two opposing grooves.

8. The differential locking system of claim 1, wherein the diameter of the second circular section of the push rod is less than the diameter of the first circular section of the push rod.

9. A differential locking system comprising:
   an axle shaft;

a clutch assembly configured to cooperate with the axle shaft;

a shift fork configured to cooperate with the clutch assembly; and a push rod configured to militate against a rotational movement of the shift fork, wherein the push rod includes a key portion.

10. The differential locking system of claim 9, wherein the shift fork is configured to militate against the rotational movement of the shift fork.

11. The differential locking system of claim 9, further comprising a carrier housing at least partially surrounding the shift fork and the push rod, wherein the carrier housing is configured to cooperate with at least a portion of the push rod to militate against the rotational movement of the shift fork.

12. The differential locking system of claim 9, wherein at least a portion of the push rod has a cross-sectional shape configured to cooperate with a cross-sectional shape of an inner surface of an opening of the shift fork to militate against the rotational movement of the shift fork.

13. The differential locking system of claim 12, wherein at least one of the portion of the push rod and the inner surface of the opening of the shift fork has a D-shaped cross-section.

14. The differential locking system of claim 9, wherein a portion of the push rod includes a slot formed therein.

15. The differential locking system of claim 14, wherein the key portion is press fit into the slot.

16. The differential locking system of claim 9, wherein the key portion is integrally formed with the push rod.

17. The differential locking system of claim 9, wherein at least a portion of the key portion selectively engages with a portion of a carrier housing to militate against the rotational movement of the shift fork.

18. A differential locking system comprising:

an axle half shaft;

a locking differential;

a sliding clutch assembly slidingly engaged with the axle half shaft, wherein the sliding clutch assembly comprises:
 a sliding clutch coupled to a portion of the axle half shaft, wherein the sliding clutch includes a plurality of sliding clutch teeth;
 a fixed clutch having a plurality of fixed clutch teeth, wherein the fixed clutch teeth are selectively engaged to the sliding clutch teeth;

a shift fork having a first end and a second end, wherein the first end is drivingly engaged with the sliding clutch, wherein the second end has an interior surface defining a circular aperture therein, and wherein the interior surface has a substantially flat and straight portion;

a push rod including a first circular section having a first flat portion and a second circular section, wherein the first flat portion of the push rod engages the substantially flat and straight portion in the interior surface of the shift fork; and a carrier housing at least partially surrounding the shift fork and the push rod, wherein the carrier housing includes an opening configured to lock a portion of the second circular section of the push rod, and wherein the opening in the carrier housing includes an oval end portion.

\* \* \* \* \*